(12) United States Patent
Jiang et al.

(10) Patent No.: US 8,621,971 B2
(45) Date of Patent: Jan. 7, 2014

(54) CUTTING APPARATUS WITH ADJUSTABLE MECHANISM

(75) Inventors: Fang Jiang, Shenzhen (CN); Fa-Ye Li, Shenzhen (CN); Peng Tan, Shenzhen (CN); Yang Bi, Shenzhen (CN); Li-Heng Cen, Shenzhen (CN); Yuan-Xu Zou, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

(*) Notice: Subject to any disclaimer, the term of this patent is extended or adjusted under 35 U.S.C. 154(b) by 231 days.

(21) Appl. No.: 13/010,529

(22) Filed: Jan. 20, 2011

(65) Prior Publication Data

US 2012/0017740 A1  Jan. 26, 2012

(30) Foreign Application Priority Data

Jul. 23, 2010 (CN) .......................... 2010 1 0234740

(51) Int. Cl.
*B26D 5/08* (2006.01)
*B26D 1/00* (2006.01)

(52) U.S. Cl.
USPC .................................. 83/526; 83/644; 83/694

(58) Field of Classification Search
USPC ............. 83/523, 556, 559–61, 582, 588, 589, 83/597–600, 601, 607, 608, 609, 653, 673, 83/675, 694, DIG. 945, 950, 913, 907, 83/908, 909, 910, 914, 929.1, 929.2, 942, 83/435.11, 435.19, 435.21, 435.25, 437.6, 83/549; 30/244, 245, 254, 257, 261
See application file for complete search history.

(56) References Cited

U.S. PATENT DOCUMENTS

| | | | | |
|---|---|---|---|---|
| 492,931 A * | 3/1893 | Baird | .............................. | 30/180 |
| 3,195,238 A * | 7/1965 | Grenell | .......................... | 33/538 |
| 4,829,651 A * | 5/1989 | Shirai | ............................. | 29/430 |
| 5,197,393 A * | 3/1993 | Yeakle | ............................. | 108/10 |
| 5,317,952 A * | 6/1994 | Immega | .......................... | 91/418 |
| 5,353,946 A * | 10/1994 | Behrend | ....................... | 220/326 |
| 5,570,769 A * | 11/1996 | Eicher et al. | .................. | 192/143 |
| 5,784,740 A * | 7/1998 | DiSieno et al. | ................. | 14/71.3 |
| 6,086,294 A * | 7/2000 | Danchine et al. | ............. | 409/132 |
| 6,230,598 B1 * | 5/2001 | Ressler | ........................... | 83/372 |
| 6,481,038 B2 * | 11/2002 | Lounsbury et al. | ............ | 14/71.1 |
| 7,753,629 B1 * | 7/2010 | McCulloch | ................... | 409/224 |
| 2008/0184566 A1 * | 8/2008 | Deter | .............................. | 30/252 |

* cited by examiner

*Primary Examiner* — Sean Michalski
*Assistant Examiner* — Jonathan G Riley
(74) *Attorney, Agent, or Firm* — Altis Law Group, Inc.

(57) ABSTRACT

A cutting apparatus configured for aligned with a gate of an injection molding part, includes a bottom board, a main adjustable mechanism attached to the bottom board, and a cutting mechanism. The main adjustable mechanism includes a driving device, a mounting member attached to the driving device, and a rotatable member rotatably attached to the mounting member. The rotatable member can be rotatable relative to the mounting member between a first position, where an acute angle is formed between the rotatable member and the mounting member, and a second position, where the rotatable member parallel to and abuts the mounting member.

18 Claims, 9 Drawing Sheets

CUTTING APPARATUS WITH ADJUSTABLE MECHANISM

CROSS-REFERENCE TO RELATED APPLICATIONS

This application is related to co-pending applications entitled, "CUTTING APPARATUS WITH ADJUSTABLE MECHANISM", filed on Jan. 18, 2011, application Ser. No. 13/008,106, and "CUTTING APPARATUS WITH CUTTING MECHANISM", filed on Jan. 18, 2011, application Ser. No. 13/008,109.

BACKGROUND

1. Technical Field

The present disclosure relates to cutting apparatuses, and particularly to a cutting apparatus for automatically aligning with a gate of an injection molding part.

2. Description of Related Art

A gate is located an end of an injection molding part. When the injection molding part is completed, the gate should be broken off. An automatic cutting device can be used to automatically cut the gate. However, the gate is often deformable when cooling, so that the gate does not aligned with the automatic cutting device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
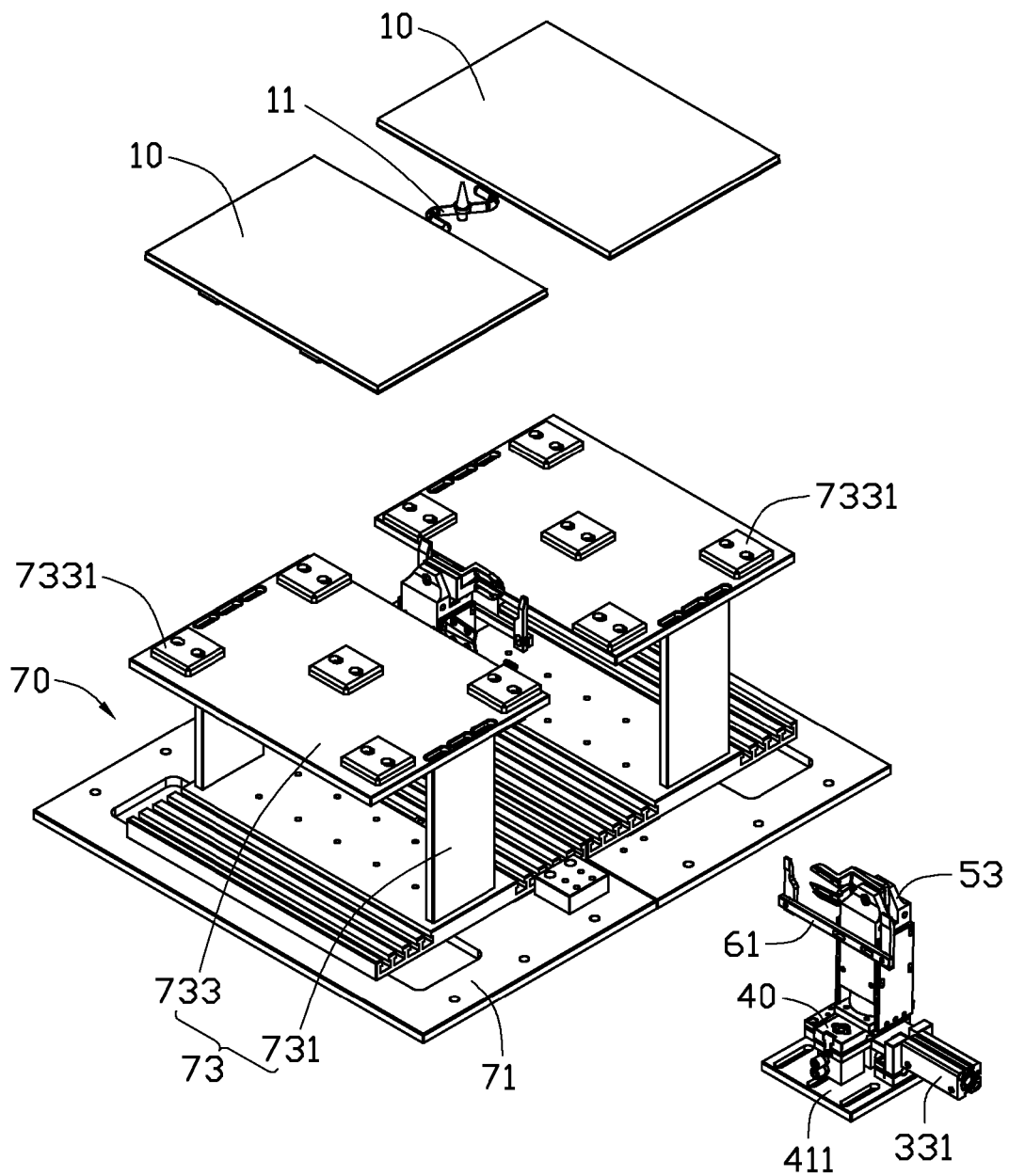
FIG. 1 is an exploded, isometric view of two operation platforms, two injection molding parts, and cutting apparatus in accordance with an embodiment.
Figure 2:
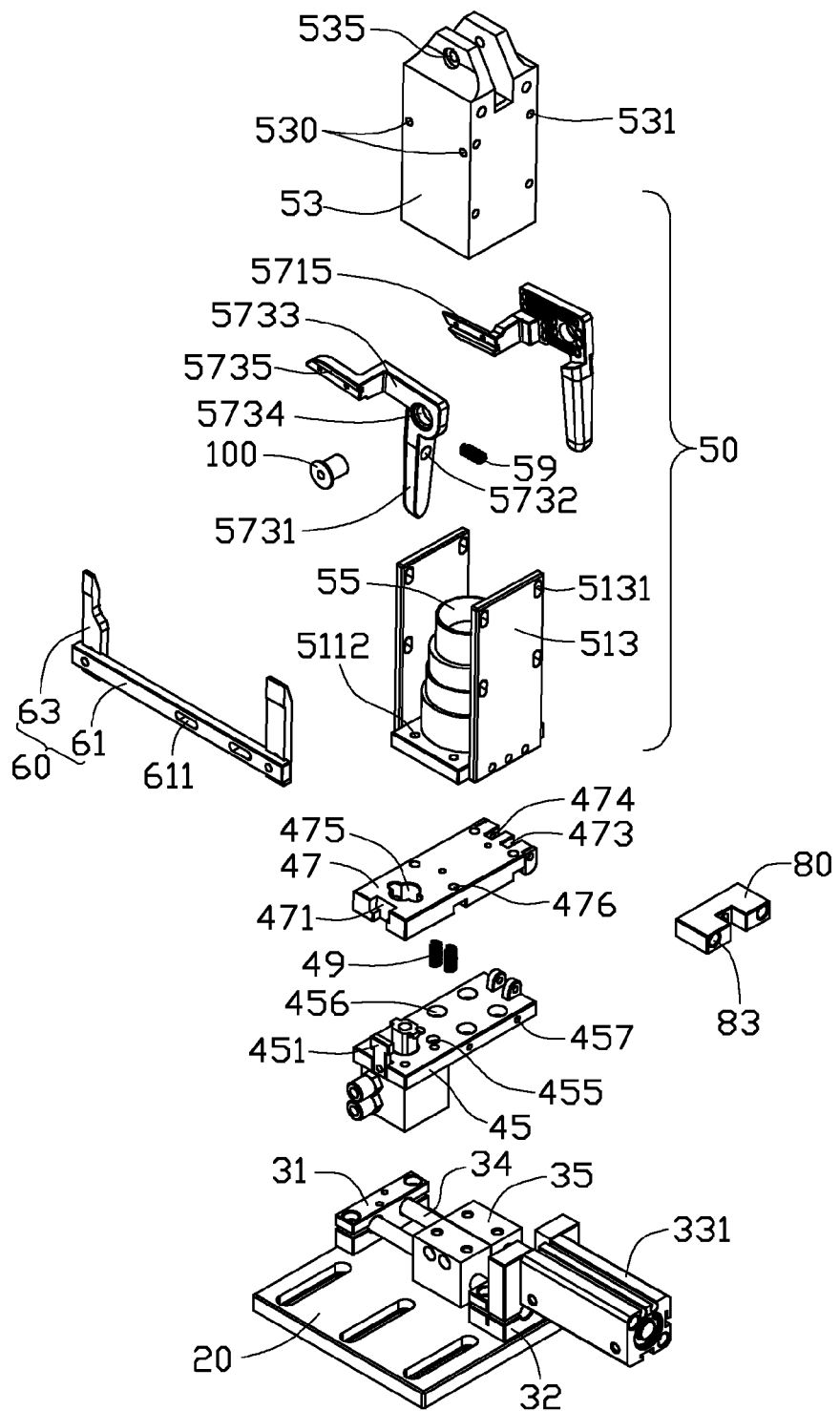
FIG. 2 is an exploded, isometric view of a cutting apparatus in accordance with an embodiment.
Figure 3:
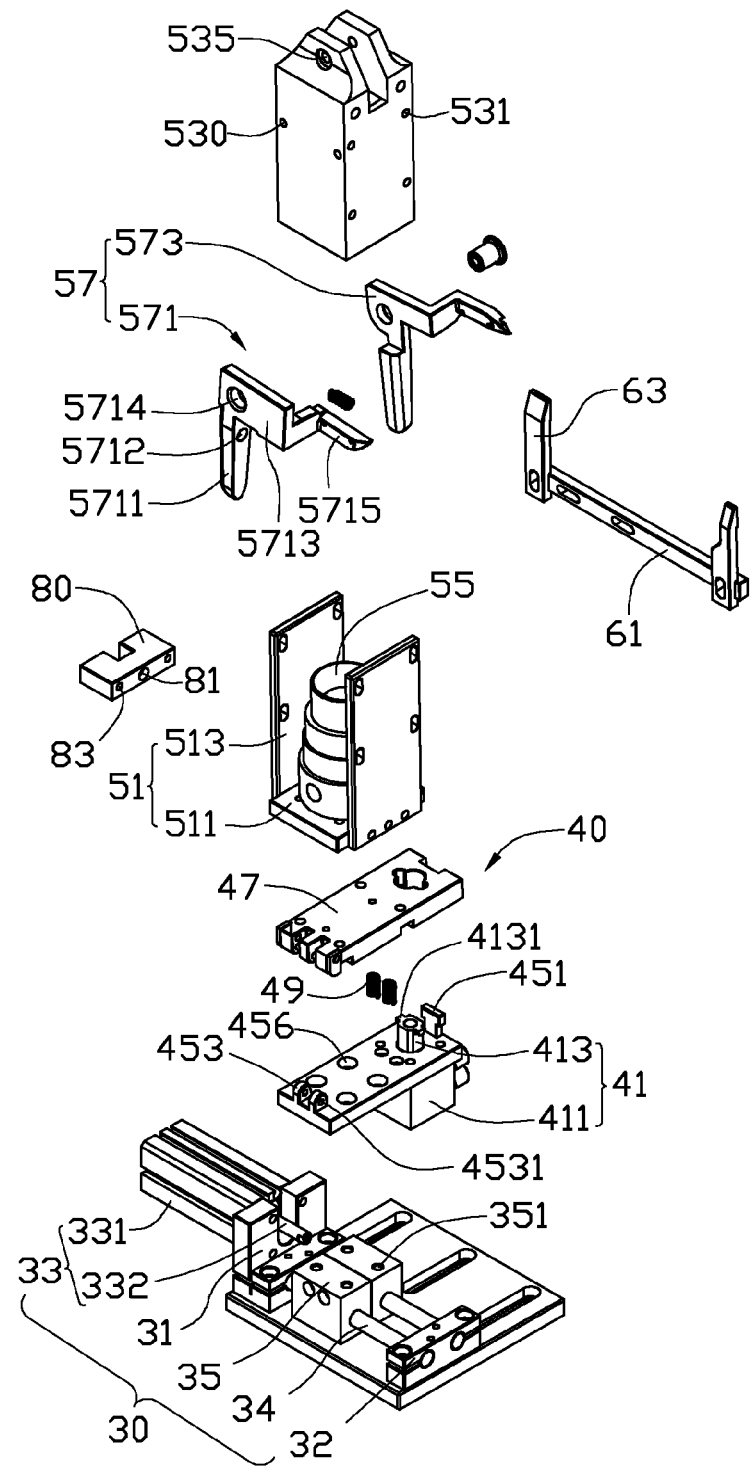
FIG. 3 is similar to FIG. 2, but viewed from a different aspect.

Referring to FIGS. 1, 2 and 3, shows a cutting apparatus in accordance with one embodiment, includes a bottom board 20 and a pushing mechanism 30 located on the bottom board 20. A main adjustable mechanism 40 is mounted to the pushing mechanism 30, a cutting mechanism 50 is mounted to the main adjustable mechanism 40, and an assistant adjustable mechanism 60 is attached to the cutting mechanism 50. In one embodiment, the cutting apparatus is used to cut a gate 11 of a runner system between two injection molding parts 10.

Referring to FIG. 1, the cutting apparatus can be placed on an operation platform 70. The operation platform 70 includes a base 71, and two stages 73 located on the base 71. Each stage 73 includes a plate 731 attached to the base 71 and a securing board 733 that is substantially perpendicular to the plate 731. A number of positioning members 7331 are located on the securing board 733, securing the injection molding parts 10.

Figure 4:
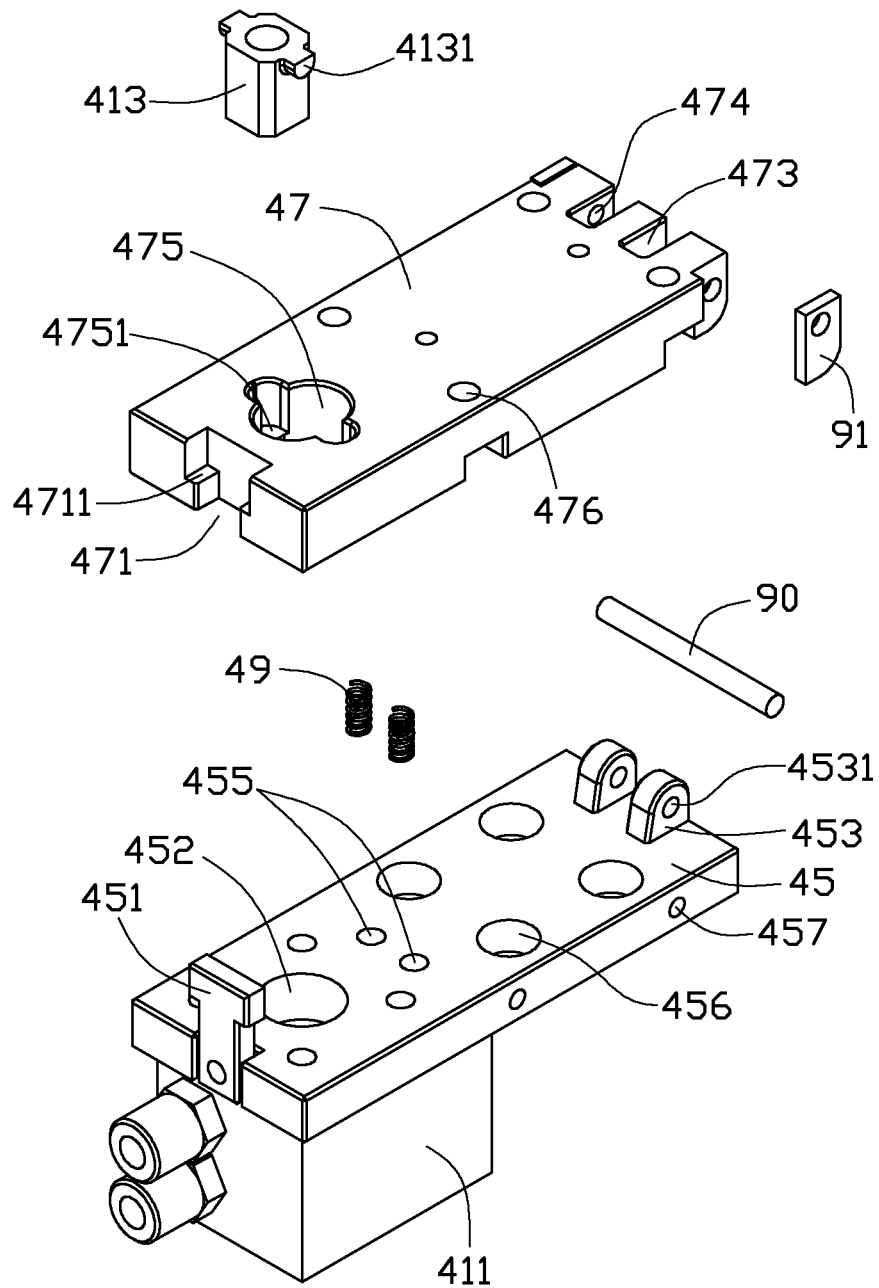
FIG. 4 is an exploded, isometric view of an main adjustable mechanism in accordance with an embodiment.

Referring to FIGS. 2-4, the pushing mechanism 30 includes a first block 31, a second block 32, a pushing member 33, two shafts 34 connected to the first and second blocks 31,32, and a sliding member 35 slidably attached to the two shafts 34. The pushing member 33 includes a pushing cylinder 331 and a pushing pole 332 connected to the pushing cylinder 331. Two securing holes 351 are defined in each sliding member 35.

The main adjustable mechanism 40 includes a driving device 41, a mounting member 45 attached to the driving device 41, a rotatable member 47 rotatably secured to the driving device 41, two first resilient components 49 sandwiched between the mounting member 45, and the rotatable member 47.

The driving device 41 includes a driving cylinder 411 and a driving pole 413 that is attached to the driving cylinder 411 and extends through the mounting member 455. Two clipping portions 4131 are disposed on opposite edges of the driving pole 413. A T-shaped clasping piece 451 is secured to a first end of the mounting member 45, and two positioning portions 453 are located on an opposite second end of the mounting member 45. A positioning hole 4531 is defined in each positioning portion 453. A through hole 452 is defined in the mounting member 45 and adjacent to the clasping piece 451. Two receiving holes 455 and four mounting holes 456 are defined in the mounting member 45. The receiving holes 455 are used to receive the two first resilient components 49, and the four mounting holes 456 correspond to the four securing holes 351 of the two sliding members 35. Two fixing holes 457 are defined in one side of the mounting member 45, and an intermediate member 80 can be secured to the mounting member 45 by the two fixing holes 457. Two limiting holes 83 and a resisting hole 81 are defined in the intermediate member 80.

A limiting slot 471 with two steps 4711 is defined in a first end of the rotatable member 47. The two steps 4711 are engaged with the clasping piece 451 of the mounting member 45, for preventing the rotatable member 47 from being moved away the mounting member 45. A containing hole 475, adjacent to the limiting slot 471 is defined in the rotatable member 47, for receiving the driving pole 413. A ledge 4751 is formed in an inner surface of the containing hole 475, for engaging with the clipping portion 4131. The driving pole 413 moves to pull the ledge 4751 to move, for rotating the rotatable member 47 near to the mounting member 45. An accommodating portion 473 is located on the second end of the rotatable member 47, for receiving the positioning portion 453. Two perforations 474 are defined in two sides of the accommodating portion 473. Four fastening holes 476 are defined in an upper surface of the rotatable member 47. Two resisting slots (not shown) are defined in a lower surface of the rotatable member 47, for receiving the first resilient component 49.

The cutting mechanism 50 includes a first enclosure 51, a second enclosure 53 received in the first enclosure 51, a driving member 55, a cutting member 57 and a second resilient component 59. In one embodiment, the driving member 55 is attached to the first enclosure 51 and is received in the second enclosure 53; The cutting member 57 engages with the driving member 55.

The first enclosure 51 includes a bottom plate 511 and two side plates 513, connected to two opposite edges of the bottom plate 511. Four base holes 5112 are defined in the bottom plate 511, corresponding to the fastening holes 476. A number of screwing holes 5131 are defined in each side plate 513. Two first thread holes 530 and a number of second thread holes 531 are defined in different sides of the second enclosure 53. Two pivot holes 535 are defined in an end of the second enclosure 53. In one embodiment, the driving member 55 is received in a mounting enclosure 56 (shown in FIG. 6). The driving member 55 includes a first driving portion 551 and a second driving portion 553 accommodated in the first driving portion 551. The second driving portion 553 moves upwards or downwards relative to the first driving portion 551. In one embodiment, the driving member 55 is a plunger, and the first driving portion 551 has a diameter greater than that of the second driving portion 553.

The cutting member 57 includes a first cutting section 571 and a second cutting section 573 rotatably secured to the first cutting section 571. The first cutting section 571 includes a first handle 5711, a connecting portion 5713 connected to the first handle 5711, and a first cutting piece 5715. A first resisting slot 5712 is defined in the first handle 5711, for receiving a first end of the second resilient component 59. A first pivot hole 5714 is defined in the connecting portion 5713. In one embodiment, the second cutting section 573 has a same configuration to the first cutting section 571. The second cutting portion 573 includes a second handle 5731, a connecting portion 5733, and a second cutting piece 5735. A second resisting slot 5732 is defined in the connecting portion 5733, for receiving a second end of the second resilient component 59. In one embodiment, the connecting portions 5713, 5733 are respectively L-shaped. The connecting portion 5713 is substantially perpendicular to the first handle 5711 and the first cutting piece 5715. The connecting portion 5733 is substantially perpendicular to the second handle 5731 and the second cutting piece 5735.

The assistant adjustable mechanism 60 includes a rail 61 and two adjustable pieces 63 perpendicularly located two opposite ends of the rail 61. Two retaining holes 611 are defined in the rail 61, corresponding to the first thread hole 530 of the second enclosure 53.

Figure 5:
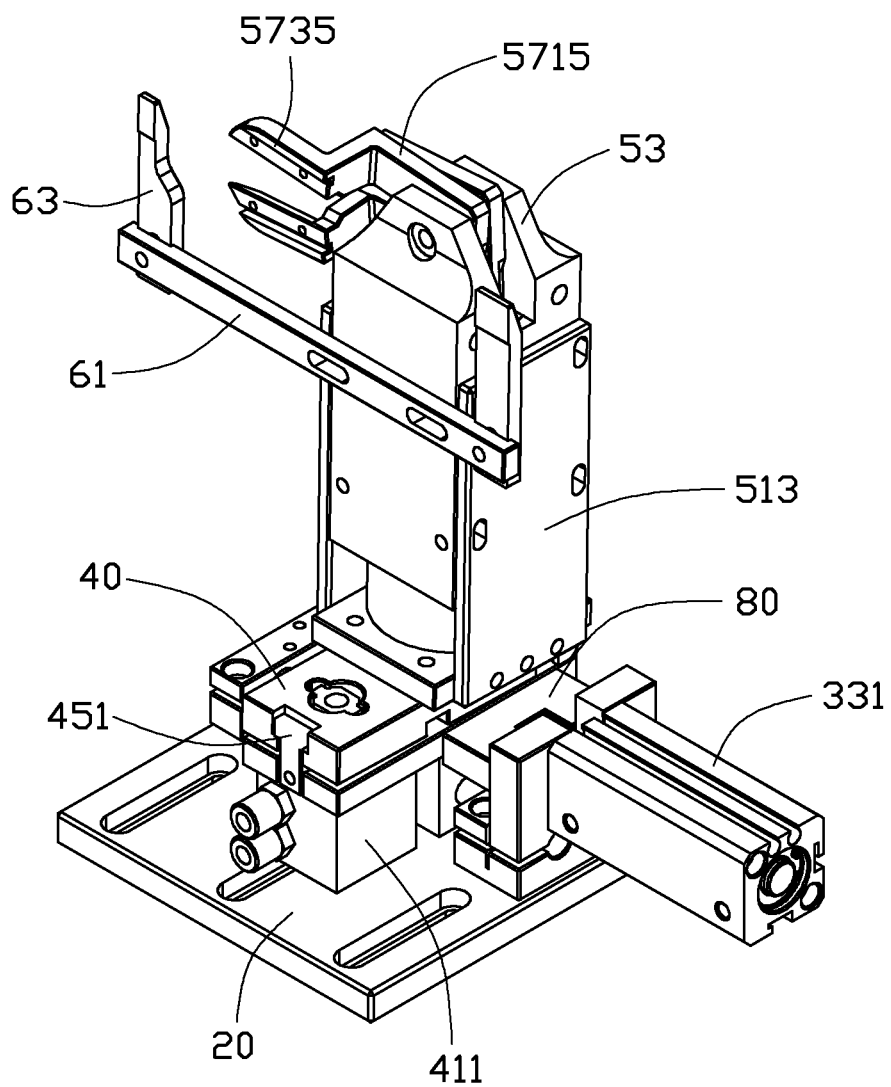
FIG. 5 is an assembled view of FIG. 3, showing a rotatable member in a first position and a cutting member in a first configuration.
Figure 6:
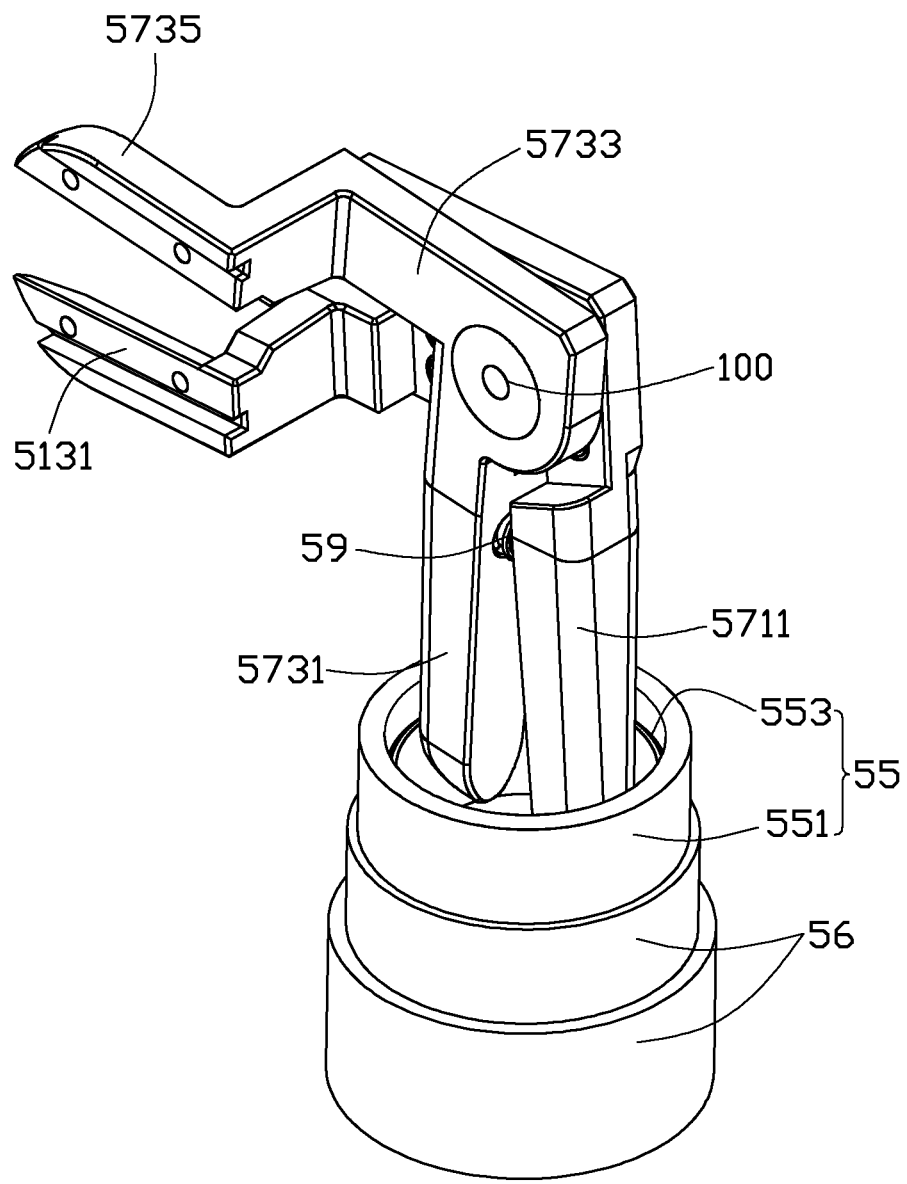
FIG. 6 is an assembled view of the cutting member and a driving member in accordance with an embodiment.

Referring to FIGS. 5 and 6, in assembly, the driving device 41 and the mounting member 45 are placed on the bottom board 20. The mounting holes 456 of the mounting member 45 are aligned with the securing holes 351 of the sliding member 35. A number of fixing members (not shown) are screwed into the mounting holes 456 and the securing holes 351, to secure the mounting member 45 to the sliding member 35. The rotatable member 47 is placed on the mounting member 45, and the driving pole 413 is received in the containing hole 475. The positioning portion 453 of the mounting member 45 is received into the accommodating portion 473. A positioning component 90 is passed through the positioning holes 4531 and the perforations 474, and two positioning pieces 91 are respectively attached to the two ends of the positioning component 90. Thus, the rotatable member 47 is rotatably attached to the mounting member 45. A first end of each first resilient component 49 is received in each receiving hole 455 of the mounting member 45, and a second end of each first resilient component 49 is received in each resisting hole of the rotatable member 47. The clasping piece 451 is received in the limiting slot 471.

The rotatable member 47 can be rotatable relative to the mounting member 45 between a first position and a second position. In the first position, the two first resilient components 49 are in an original state. The clasping piece 451 is engaged with the step 4711 of the limiting slot 471, the clipping portions 4131 of the driving pole 413 are engaged with the ledge 4751, and an acute angle is formed between the rotatable member 47 and the mounting member 45. In the second position, the two first resilient components 49 are in a deformed state, and the clasping piece 451 is disengaged from the step 4711 of the limiting slot 471. The clipping portions 4131 of the driving pole 413 are disengaged from the ledge 4751, and the rotatable member 47 parallelly abuts the mounting member 45.

The pushing pole 332 of the pushing member 33 are inserted into the resisting hole 81 of the intermediate member 80. The intermediate member 80 abuts the mounting member 45. The limiting holes 83 of the intermediate member 80 are aligned with the fixing holes 457 of the mounting member 45. Two fixing members (not shown) are screwed into the limiting holes 83 and the fixing holes 457, to mount the intermediate member 80 to the mounting member 45.

The bottom plate 511 of the first enclosure 51 is placed on the rotatable member 47. The base holes 5112 of the bottom plate 511 are aligned with the fastening holes 476 of the rotatable member 47. Four fastening members (not shown) are screwed into the base holes 5112 and the fastening holes 476. Therefore, the first enclosure 51 is attached to the rotatable member 47. The driving member 55 is received in the second enclosure 53, and the second enclosure 53 is received in the first enclosure 51. The second thread holes 531 are aligned with the screw holes 5131. A number of fixing components (not shown) are received in the second thread holes 531 and the screw holes 5131. Therefore, the second enclosure 53 and the first enclosure 51 are mounted together.

The first and second cutting sections 571, 573 of the cutting member 57 extend downwards into the second enclosure 53. The pivot holes 535 of the second enclosure 53 are aligned with the first pivot hole 5714 and the second pivot hole 5737. A pivoting member 100 is inserted into the pivot holes 535, the first pivot hole 5714, and the second pivot hole 5737; to rotatably mount the first cutting section 571 to the second cutting section 573. The first end of the second resilient component 59 is resisted in the first resisting slot 5712, and the second end of the second resilient component 59 is resisted in the second resisting slot 5732. Therefore, the second resilient component 59 is sandwiched between the first cutting section 571 and the second cutting section 573.

The cutting member 57 can be moved between a first configuration and a second configuration. In the first configuration, the second resilient component 59 is in an original state, and the first and second handles 5711, 5731 respectively abut an inner surface of the first driving portion 551 of the driving member 55. A gap is defined between the first cutting piece 5715 and the second cutting piece 5735. In the second configuration, the second resilient component 59 is in a deformed state, and the first and second handle 5711, 5731 abut each other, for respectively abutting an inner surface of the second driving portion 553 of the driving member 55. Therefore, the first cutting piece 5715 and the second cutting piece 5735 are closed.

The assistant adjustable mechanism 60 is placed on one side of the second enclosure 53. The retaining holes 611 of the rail 61 are aligned with the first thread holes 530 of the second enclosure 53. Two retaining members (not shown) are inserted into the retaining holes 611 and the first thread holes 530, to secure the assistant adjustable mechanism 60 to the second enclosure 53.

Figure 7:
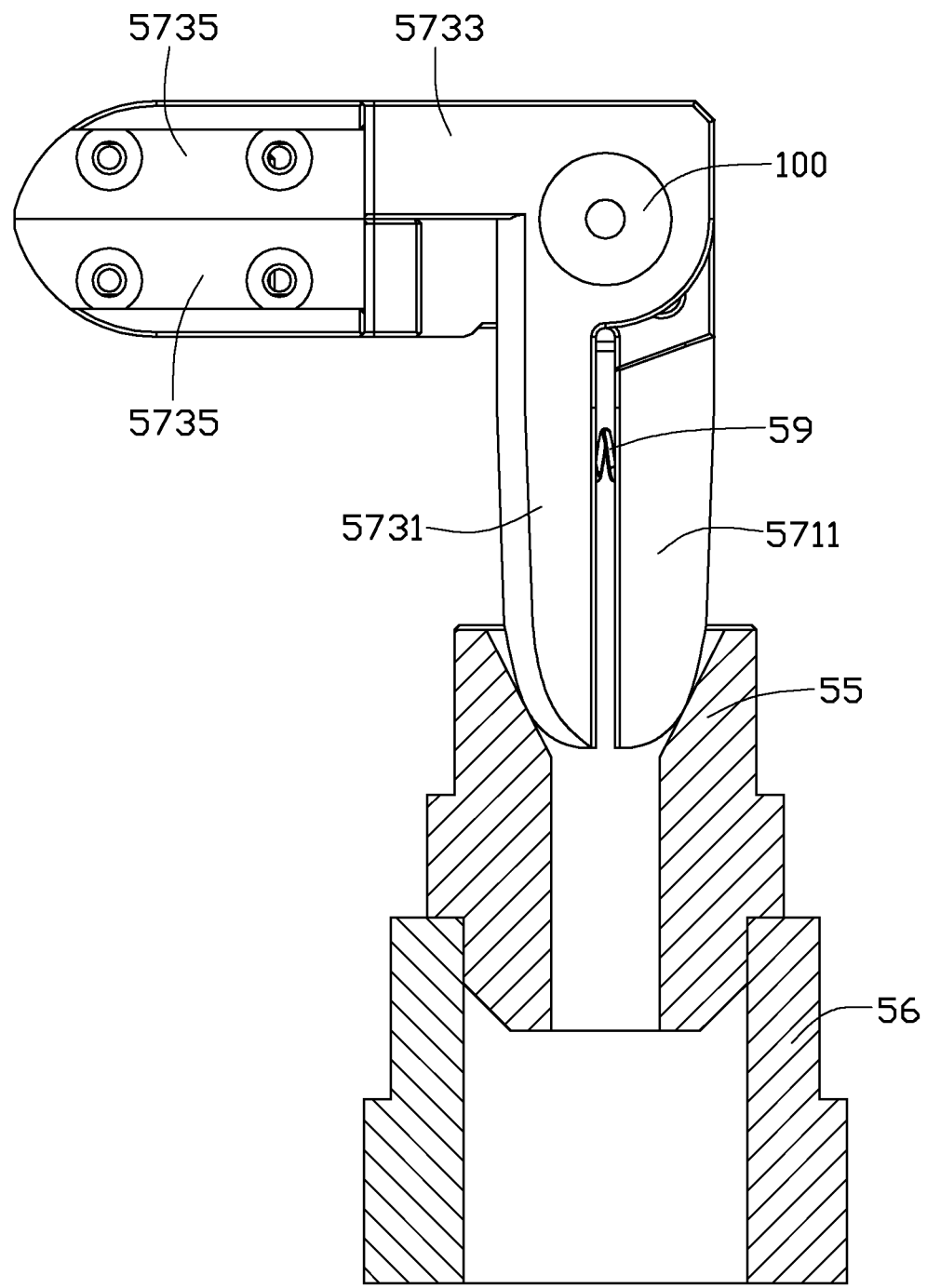
FIG. 7 is similar to FIG. 6, but shows the cutting member in a second configuration.
Figure 8:
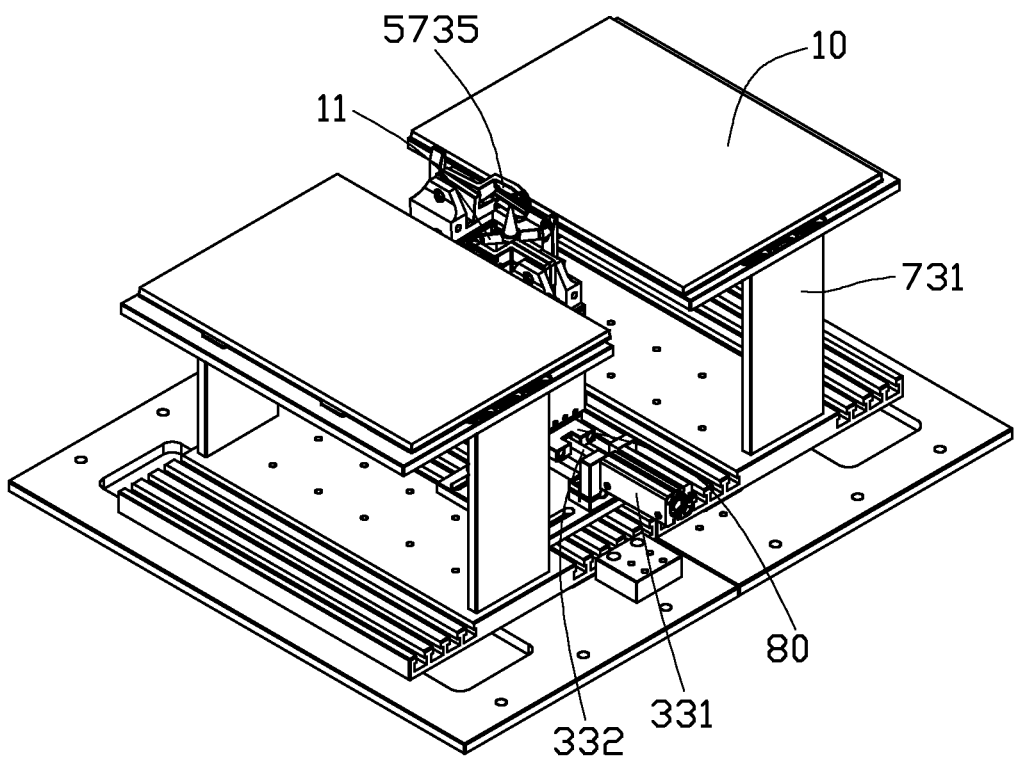
FIG. 8 is an assembled view of FIG. 1.
Figure 9:
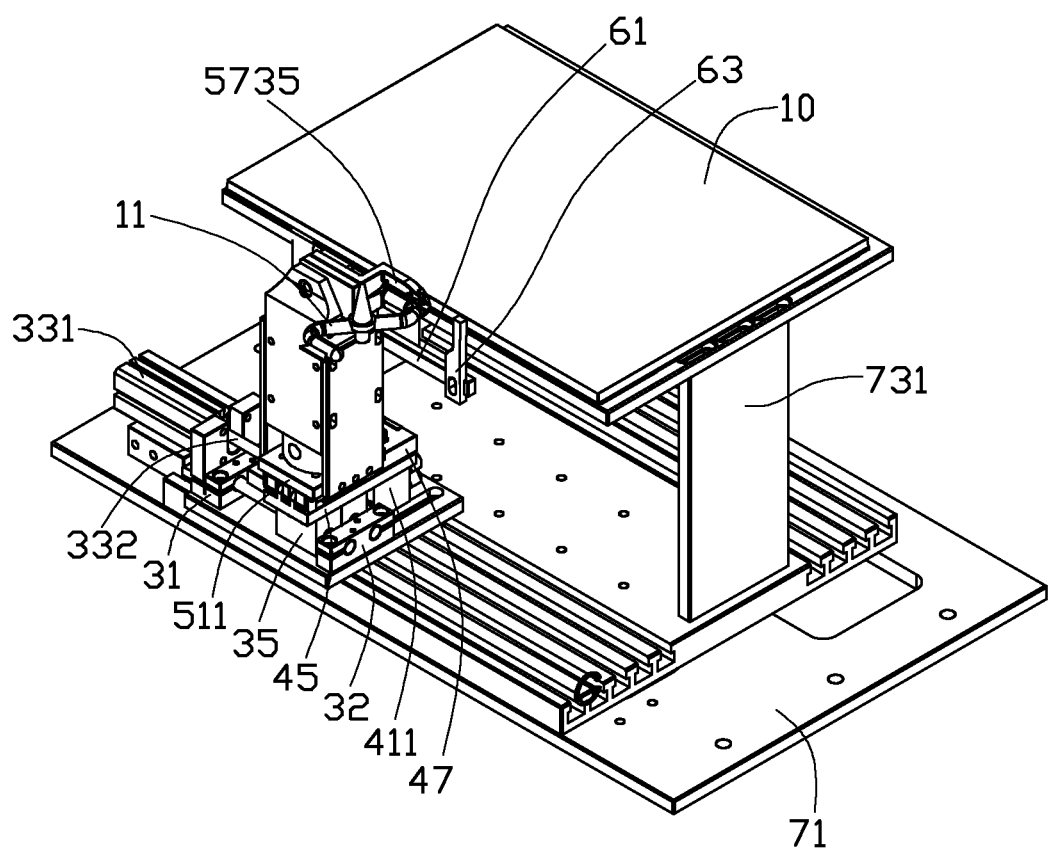
FIG. 9 is an assembled view of the cutting apparatus, an operation platform and an injection molding part in accordance with an embodiment.

Referring to the FIGS. 7-9, in use, in the original state, the rotatable member 47 is located in the first position, and the cutting member 57 is also located in the first configuration. The bottom board 20 is attached between the two stages 73 of the operation platform 70. Two injection molding parts 10 are respectively placed on the positioning member 7331 of the two securing boards 733. The adjustable pieces 633 abut one side of an injection molding parts 10.

The pushing cylinder 331 of the pushing member 33 starts to work, to move the pushing pole 332. Therefore, the intermediate member 80 on the pushing pole 332 can be moved in a first direction away from the pushing cylinder 331. Then, the mounting member 45 engaged with the intermediate member 80 can move in the first direction, near the gate 11 of the injection molding part 10. At the same time, the sliding member 35 attached to the mounting member 45 can be moved in the first direction, until the gate 11 is located in the gap formed by the first and second cutting piece 5715, 5735.

Then, the driving cylinder 411 of the driving device 41 starts to work, to move the driving pole 413 near to the driving cylinder 411. Therefore, the driving pole 413 can rotate the rotatable member 47 by the positioning component 90, until the rotatable member 47 is rotated to the second position, and the gate 11 abuts the first and second cutting pieces 5715, 5735.

The second driving portion 553 of the driving member 55 is moved upwards relative to the first driving portion 551 with an injection device (not shown), for driving the first and second handle 5711, 5731 to abut the inner surface of the second driving portion 553. The second driving portion 553 is further moved upwards, until the cutting member 57 is rotated to the second configuration. Therefore, the cutting member 57 can cut the gate 11.

When the gate 11 is cut, the second driving portion 553 is moved downwards into the first driving portion 551. The first and second handles 5711, 5731 are disengaged from the second driving portion 553, to rotate back the cutting member 57, until the cutting member 57 is rotated to the first configuration.

The driving cylinder 411 of the driving device 41 starts to work, to move the driving pole 413 away from the driving cylinder 411. So the driving pole 413 can rotate the rotatable member 47 by the positioning component 90, until the rotatable member 47 is rotated to the first position.

The pushing cylinder 331 of the pushing member 33 starts to move the pushing pole 332. Therefore, the intermediate member 80 on the pushing pole 332 can be moved in a second direction near to the pushing cylinder 331. Then, the mounting member 45 and the sliding member 35 are moved together in the second direction, waiting the next gate 11.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A cutting apparatus comprising: a bottom board; a main adjustable mechanism attached to the bottom board, comprising a mounting member, and a rotatable member rotatably attached to the mounting member; a limiting slot defined in a free end of the rotatable member, the rotatable member comprising a step extending from an edge of the limiting slot, a clasping piece extending from a free end of the mounting member and received in the limiting slot, a first resilient component located between the mounting member and the rotatable member; the first resilient component is substantially perpendicular to the mounting member; and a cutting mechanism attached to the main adjustable mechanism; wherein the rotatable member can be rotated relative to the mounting member between a first position, where an acute angle is formed between the rotatable member and the mounting member, and a second position, where the rotatable member parallel to and abuts the mounting member; the rotatable member is rotatable relative to the mounting member between a first position, where an acute angle is formed between the rotatable member and the mounting member, and the step is engaged with the clasping piece, and a second position, where the rotatable member parallel to and abuts the mounting member, and the step is disengaged from the clasping piece when the rotatable member is in the second position and a driving device provided with a driving pole engages the rotatable member to pull the rotatable member to move to the second position from the first position.

2. The cutting apparatus of claim 1, wherein the driving device is configured for rotating the rotatable member.

3. The cutting apparatus of claim 2, wherein the driving device comprises a driving cylinder and the driving pole is connected to the driving cylinder, the driving cylinder is attached to a bottom surface of the mounting member, and the driving pole extends through the mounting member and engages with the rotatable member when the rotatable member is located in the first position and the second position.

4. The cutting apparatus of claim 3, wherein a containing hole is defined in the rotatable member, a ledge is located an inner surface of the containing hole, and the ledge is engaged with the driving pole when the rotatable member is located in the first position.

5. The cutting apparatus of claim 1, wherein the first resilient component is in an original state when the rotatable member is in the first position, and the first resilient component is in a deformed state when the rotatable member is in the second position.

6. The cutting apparatus of claim 1, wherein the clasping piece is located on the mounting member, the step is located on the rotatable member, and the step is engaged with the clasping piece when the rotatable member is in the first position.

7. The cutting apparatus of claim 6, wherein the clasping piece is T-shaped.

8. The cutting apparatus of claim 1, wherein an accommodating portion is defined in the rotatable member, a positioning portion is disposed on the mounting member, and the positioning portion is rotatably received in the accommodating portion.

9. The cutting apparatus of claim 1, further comprising a pushing mechanism, the pushing mechanism comprises a sliding member slidably attached to the bottom board, and the sliding member is mounted to the mounting member.

10. The cutting apparatus of claim 9, wherein the pushing mechanism comprises a pushing member, an intermediate member is attached to the pushing member, and the intermediate member is located between the pushing member and the mounting member.

11. A cutting apparatus comprising: an operation platform comprising a base and a stage substantially perpendicular to the base, and the stage is configured for positioning the injection molding part; a bottom board located on the base; a main adjustable mechanism attached to the bottom board, comprising a driving device, a mounting member, and a rotatable member rotatably attached to the mounting member, a limiting slot defined in a free end of the rotatable member, the rotatable member comprising a step extending from an edge of the limiting slot, a clasping piece extending from a free end of the mounting member and received in the limiting slot, the driving device comprising a driving cylinder and a driving pole connected to the driving cylinder, and a ledge disposed on the rotatable member; and a cutting mechanism attached to the main adjustable mechanism; wherein the driving pole extends through the mounting member and is engaged with the ledge, the rotatable member is rotatable relative to the mounting member between a first position, where an acute angle is formed between the rotatable member and the mounting member, and the step is engaged with the clasping piece, and a second position, where the rotatable member is parallel to and abuts the mounting member, and the step is disengaged from the clasping piece when the rotatable member is in the second position.

12. The cutting apparatus of claim 11, wherein a containing hole is defined in the rotatable member, and the ledge is located an inner surface of the containing hole.

13. The cutting apparatus of claim 11, wherein a first resilient component is located between the rotatable member and the mounting member, the first resilient component is in an original state when the rotatable member is in a first position, and the first resilient component is in a deformed state when the rotatable member is in a second position.

14. The cutting apparatus of claim 13, wherein a clasping piece is located on the mounting member, a step is located on the rotatable member, and the step is engaged with the clasping piece when the rotatable member is in the first position.

15. The cutting apparatus of claim 14, wherein the clasping piece is T-shaped.

16. The cutting apparatus of claim 11, wherein an accommodating portion is defined in the rotatable member, a positioning portion is disposed on the mounting member, and the positioning portion is rotatably received in the accommodating portion.

17. The cutting apparatus of claim 11, further comprising a pushing mechanism, the pushing mechanism comprises a sliding member slidably attached to the bottom board, and the sliding member is mounted to the mounting member.

18. The cutting apparatus of claim 17, wherein the pushing mechanism comprises a pushing member, an intermediate member is attached to the pushing member, and the intermediate member is located between the pushing member and the mounting member.

* * * * *